United States Patent
Flores

Patent Number: 6,051,132
Date of Patent: Apr. 18, 2000

[54] AQUARIUM FILTRATION SYSTEM INTAKE TUBE COVER

[76] Inventor: Enid Flores, 300 Reservoir Pl. #2G, Bronx, N.Y. 10467

[21] Appl. No.: 09/137,213

[22] Filed: Aug. 20, 1998

[51] Int. Cl.[7] ................................................. A01K 63/04
[52] U.S. Cl. ...................... 210/169; 210/232; 210/416.2; 210/460; 119/259
[58] Field of Search .................... 210/154, 169, 210/232, 258, 416.1, 416.2, 459, 460, 448, 315, 484, 485; 119/245, 259

[56] References Cited

U.S. PATENT DOCUMENTS

| | | |
|---|---|---|
| 202,513 | 4/1878 | Boettcher . |
| 304,318 | 9/1884 | Hean . |
| 1,788,709 | 1/1931 | De Spain . |
| 1,905,919 | 4/1933 | Levis . |
| 2,783,893 | 3/1957 | Romanoff . |
| 2,956,507 | 10/1960 | Hutchinson . |
| 3,381,822 | 5/1968 | Martin . |
| 3,635,344 | 1/1972 | Lovitz . |
| 4,035,303 | 7/1977 | Ufferfilge ................................ 210/316 |
| 4,880,531 | 11/1989 | Blake ...................................... 210/169 |
| 5,089,108 | 2/1992 | Small . |
| 5,269,338 | 12/1993 | Figas . |
| 5,413,707 | 5/1995 | Shatilov .................................. 210/169 |
| 5,624,560 | 4/1997 | Voll et al. . |
| 5,840,091 | 11/1998 | Strong . |

*Primary Examiner*—David A. Simmons
*Assistant Examiner*—Fred Prince
*Attorney, Agent, or Firm*—Goldstein & Canino

[57] ABSTRACT

An aquarium filtration system intake cover, for use in aquariums having a filtration system having an intake tube having an intake tube mouth and an intake tube outer wall, comprising a net. The net comprises a network of criss-crossing members forming a net surface. The criss-crossing members meet at net member junctions. The net has a net mouth having an elastic band. The net mouth is extended over the intake tube mouth, and the elastic band tightens onto the intake tube outer wall. Spacers extend perpendicularly inward from the net member junctions to space the net surface from the intake tube outer wall.

4 Claims, 2 Drawing Sheets

AQUARIUM FILTRATION SYSTEM INTAKE TUBE COVER

BACKGROUND OF THE INVENTION

The invention relates to an aquarium filtration system intake tube cover. More particularly, the invention relates to a net cover which extends over an aquarium intake tube, and prevents tiny living creatures from being inadvertently sucked into the filtration system intake tube.

Modern aquarium filtration systems do much to help keep their aquatic occupants alive. The systems effectively filter out contaminants, ammonia waste, nitrates, and nitrites through a combination of mechanical, chemical, and biological filtration techniques. Much can be done with current aquarium technology to duplicate ideal conditions for the survival of all types of aquatic life.

However, when an aquarium hobbyist decides to breed their pets, many problems are encountered, and the biggest is perhaps the otherwise life-saving filtration system. In addition to the possibility that the newborn babies will be devoured by adult fish, the greater possibility exists that they will be quickly sucked into the filtration system through one its intake tubes.

A variety of different filtration constructions attempt to eliminate this problems. They are fairly complicated configurations, such as siphoned-overflow baskets which intake water for the filter is skimmed from the top surface. However, they also each have their limitations. For example, the siphoned-overflow configuration will not function properly if the water level were to drop below the top of the basket.

While these units may be suitable for the particular purpose employed, or for general use, they would not be as suitable for the purposes of the present invention as disclosed hereafter.

SUMMARY OF THE INVENTION

It is an object of the invention to produce an aquarium filtration system attachment which effectively prevents live animals from being drawn into the filtration system intake tube. Accordingly a mesh cover is provided which does not significantly inhibit flow into the filtration system, but which does not allow small aquatic life to pass therethrough.

It is another object of the invention to produce a filtration system cover which prevents the animal from even becoming caught against the net by suction at the intake tube. Accordingly, spacers extend from the net perpendicularly inward to space the net from the tube, so that water current and suction at the net surface is minimal.

It is a further object of the invention to provide an effective breeding environment, by greatly decreasing the mortality rate of newly hatched fish.

The invention is a aquarium filtration system intake cover, for use in aquariums having a filtration system having an intake tube having an intake tube mouth and an intake tube outer wall, comprising a net. The net comprises a network of criss-crossing members forming a net surface. The criss-crossing members meet at net member junctions. The net has a net mouth having an elastic band. The net mouth is extended over the intake tube mouth, and the elastic band tightens onto the intake tube outer wall. Spacers extend perpendicularly inward from the net member junctions to space the net surface from the intake tube outer wall.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
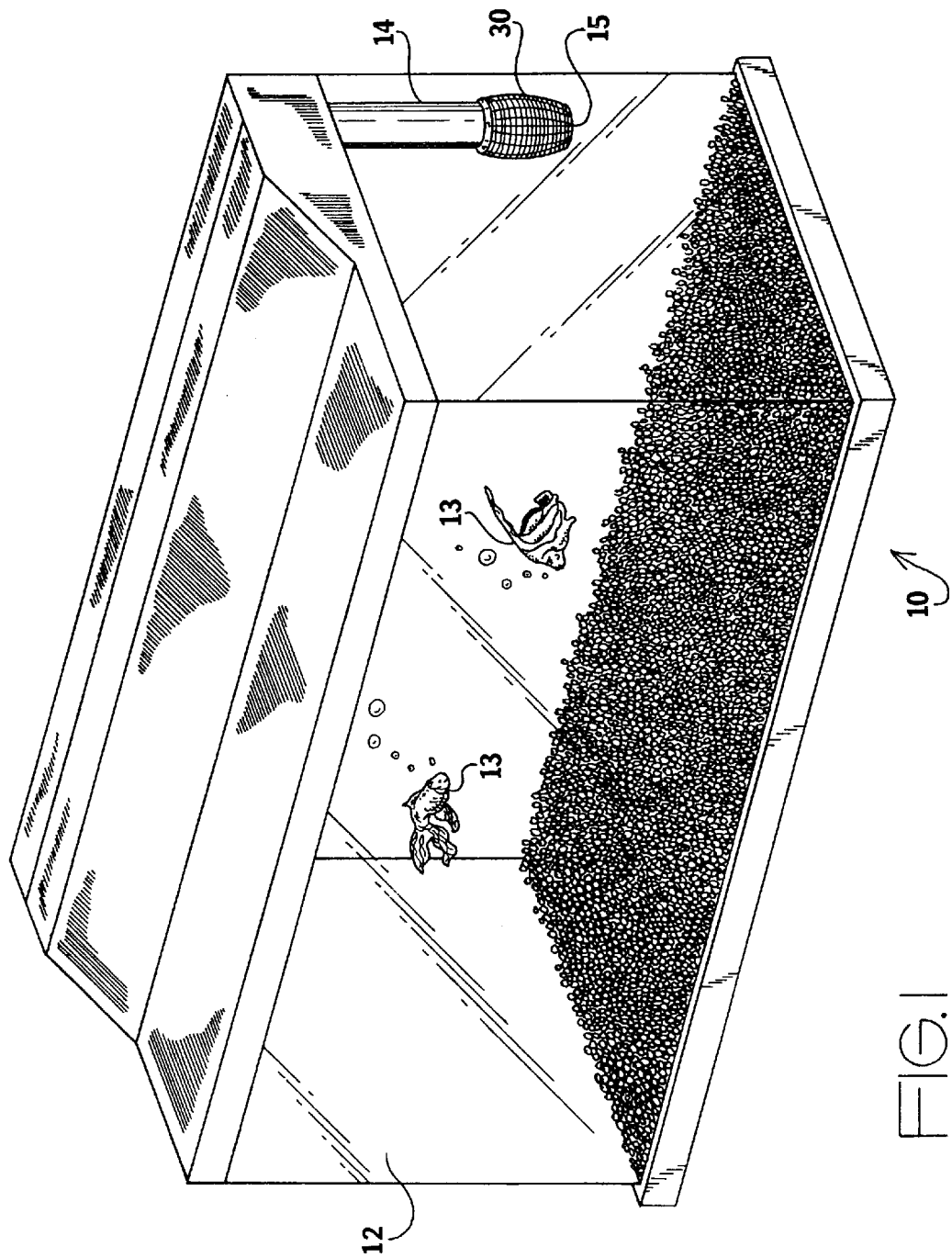
FIG. 1 is a diagrammatic perspective view, illustrating the invention installed in a typical aquarium.

FIG. 1 illustrates an aquarium 10. The aquarium contains a quantity of water 12, and aquatic life 13 living within the water 12. The aquarium 10 has a filtration system, which includes at least one intake tube 14, having a intake tube mouth 15 which is submerged within the water 12. An intake cover 30 is mounted on the intake tube 14, extending over the intake tube mouth 15.

Figure 2:
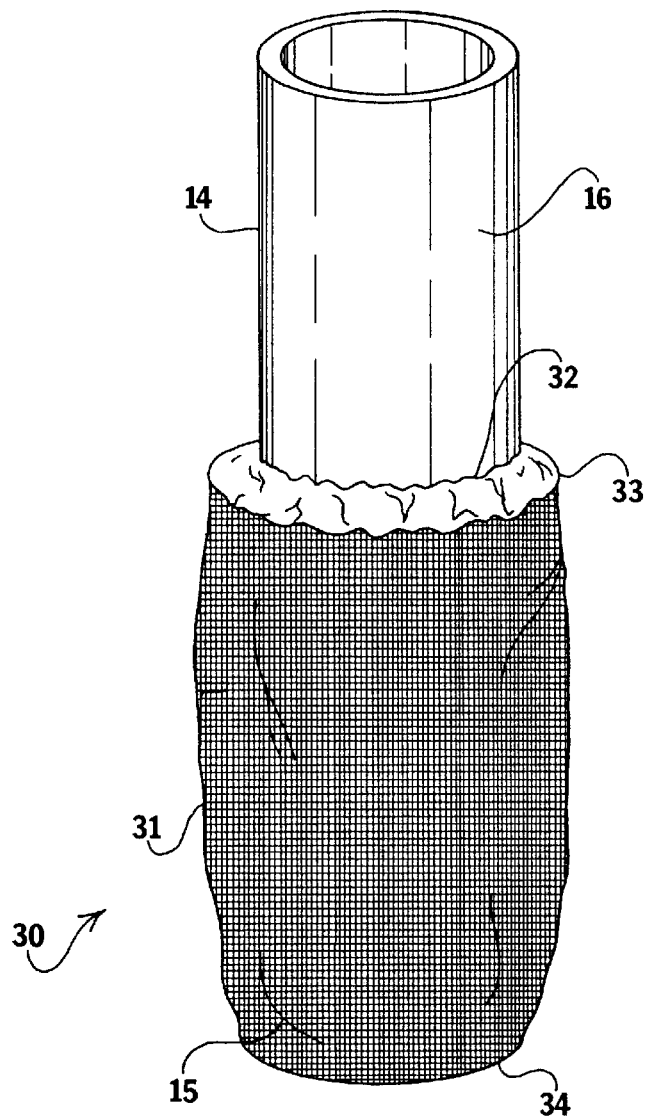
FIG. 2 is a diagrammatic perspective view, illustrating just the invention and the filtration system tube onto which said invention is attached.

FIG. 2 illustrates the intake cover 30 in greater detail. The intake tube 14 has an intake tube outer wall 16. The intake cover 30 comprises a net 31 having a net mouth 32. the net mouth 32 has an affixing mechanism for securing onto the intake tube 14. More particularly, the affixing mechanism is an elastic band 33 extending around the net mouth 32, which selectively stretches or expands to allow the net mouth 31 to extend over the intake tube mouth 15, and then constricts or contracts to tighten around the intake tube outer wall 16 to hold the net 31 thereon. The net 31 also has a round flat bottom 34 opposite the net mouth 32. The round flat bottom 34 is stiff, whereas the remainder of the net 31 is flexible.

Figure 3:
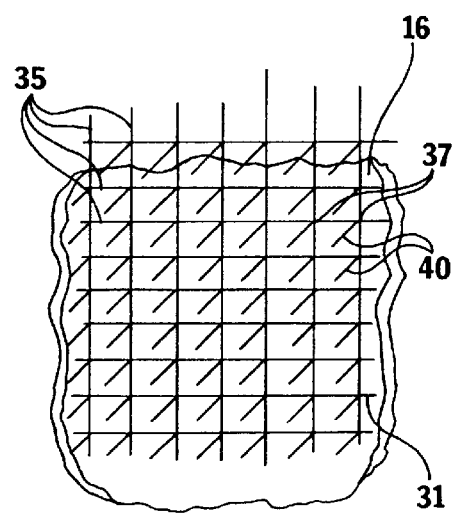
FIG. 3 is an enlarged view of the net, taken generally in the area of circle 3 in FIG. 2, illustrating the spacer spikes extending inward toward the filtration tube.

FIG. 3 is an enlarged detail of the net 31. The net is comprised of a network of crisscrossed net members 35 which form a substantially planar net surface. The net members 35 meet at a plurality of net member junctions 37. The net members 35 are located a distance from each other to ensure that newly hatched marine life cannot pass through the net 31.

In addition, According to the present invention, the net 31 has a plurality of spacers 40 which are stiff rod-like projections that extend perpendicularly inward from the net member junctions 37. The spacers 40 extend inward to engage the intake tube outer wall 16. Provided the spacers 40 are all of equal length, the net surface is spaced from the outer tube wall and extends substantially parallel thereto. This spacing of the net surface from the tube outer wall helps prevent the minute marine life from becoming caught in strong currents typically present near the intake tube mouth 15.

In conclusion, herein is presented an aquarium filtration system intake cover, which effectively covers an intake tube, and prevents minute marine life from being drawn into the filtration system through the intake tube.

What is claimed is:

1. An aquarium filtration system intake cover, for use with aquariums having an intake tube, having an intake tube mouth and an intake tube outer wall, comprising:

a net, the net capable of extending over the intake tube mouth, the net having a net mouth, the net having a substantially planar net surface comprising a network of crisscrossing members which meet at net member junctions;

an affixing mechanism, for selectively attaching the net mouth to the intake tube outer wall; and a plurality of spacers, each spacer extending perpendicularly from the net member junctions, for engaging the intake tube outer wall and spacing the net surface therefrom.

2. The aquarium filtration system intake cover as recited in claim 1, wherein the affixing mechanism further comprises an elastic band extending around the net mouth for selectively stretching to allow the net mouth to be placed over the intake tube mouth, and contracting to tighten the net mouth around the intake tube outer wall.

3. The aquarium filtration system intake cover as recited in claim 2, wherein the net further comprises a round flat bottom that is opposite the net mouth.

4. The aquarium filtration system intake cover as recited in claim 3, wherein the round flat bottom is stiff and the remainder of the net is flexible.

* * * * *